Figure 1:
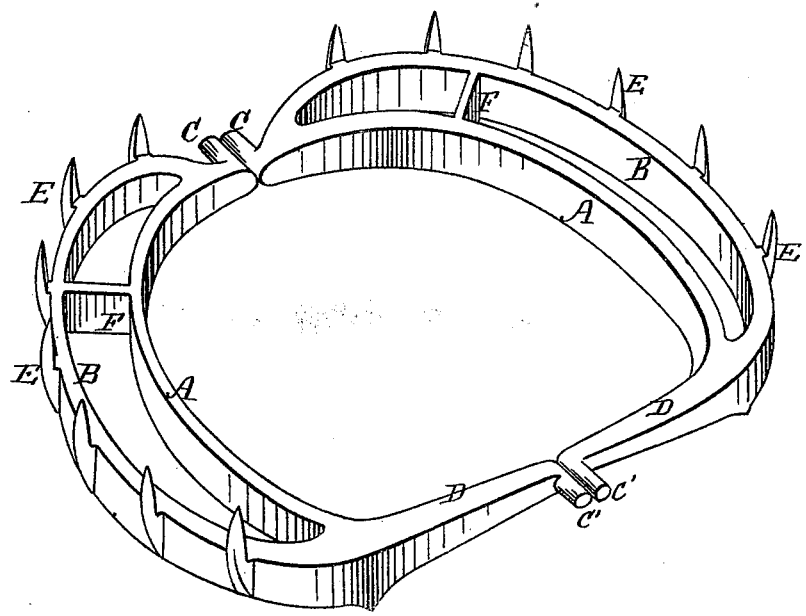

G. W. & I. B. ROBERSON.
Animal-Trap.

No. 225,948. Patented Mar. 30, 1880.

Witnesses:
W. B. Masson
W. E. Bowen

Inventors:
George W. Roberson
Ira B. Roberson
by E. E. Masson
atty.

UNITED STATES PATENT OFFICE.

GEORGE W. ROBERSON AND IRA B. ROBERSON, OF SALEM, NEW YORK.

ANIMAL-TRAP.

SPECIFICATION forming part of Letters Patent No. 225,948, dated March 30, 1880.

Application filed June 19, 1879.

*To all whom it may concern:*

Be it known that we, GEORGE W. ROBERSON and IRA B. ROBERSON, of Salem, in the county of Washington and State of New York, have invented certain new and useful Improvements in Animal-Traps; and we hereby declare that the following is a full, clear, and exact description of the same, reference being had to the accompanying drawings, making a part of this specification.

Our invention relates to that class of animal-traps commonly known as "steel traps," wherein a pair of griping-jaws, each having a plain, a recessed, or a serrated edge, are actuated by a pronged or U-shaped spring, which is released by the depression of a small platform or bait-pan arranged between the jaws of the trap.

Heretofore the griping-surfaces of the jaws of this class of traps have been made either plain and smooth to grasp an animal or a portion thereof at one point. The smooth surfaces of the jaws have also been recessed to form two edges or griping-surfaces upon each jaw, to grasp the animal in two places at the same time, and thus increase the efficiency of the trap; and for an analogous purpose traps having a single pair of jaws have been serrated, or provided with teeth adjacent to their single pair of smooth jaws.

The first-mentioned smooth jaws can be regarded as effective only with small animals, and when they are caught directly across the body or by the throat. The recessed jaws are also quite effective if the animal is caught as above; but if caught only by a leg they often escape, as the appearance of the sprung trap demonstrates. This is probably accomplished by sliding the leg from one portion of the jaws to the other and gradually working it out, forming zigzag depressions upon it, the outer jaw deadening the feeling upon the part caught, and the double clamping only reducing the power that a single pair of jaws would have. The objection to the serrated jaws is, that they will often nearly cut through the animal's leg, and he will gnaw the part caught and escape.

The object of our invention is to improve upon the above-mentioned jaws by combining a double pair of jaws with what may be considered a third one, or a series of spaced teeth, and with braces between the double pair, so that if an animal is caught by one of his limbs, or even by a fold of his skin, he cannot work it along the edge of the double pair of jaws and escape, but has the clamped portion retained immovable.

With our trap a small animal's leg may be caught either by the double jaws simply, between the spaced teeth, or additionally by the latter. In either case it cannot be moved sidewise and released by the animal.

By making our jaws separated, as a double pair, in place of simply grooved, we reduce the weight and cost, and at the same time utilize the braces by which each crescent is united to the other to accomplish a similar function as the teeth, in limiting the side motion of a caught animal's limb, when it is desired to use simply smooth jaws to catch valuable fur-bearing animals.

Our invention consists in griping-sections of a spring-trap, formed of a separate outer jaw provided with external spaced teeth, to alternately lap the teeth of the opposite jaw, and an inner jaw united to the first by intermediate braces, and at each end, so as to form a partitioned crescent opening between them, terminating into pivot-pins, upon which they may revolve, as will be hereinafter described.

The accompanying drawings show the jaws detached from the trap, as they may be readily applied to any well-known form of spring-traps, and of which—

Figure 2:
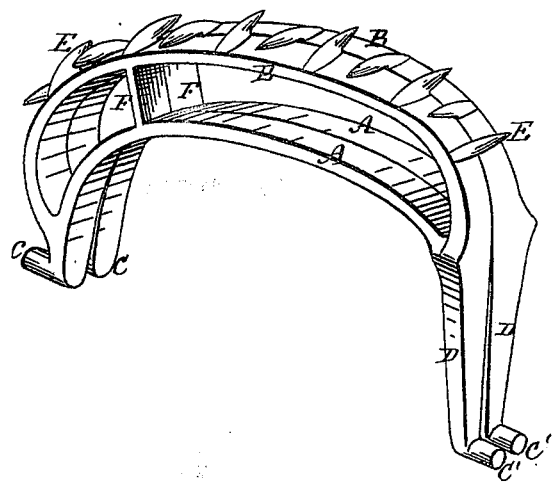

Figure 1 is a perspective view of the faces of a pair of jaws in the position shown when the trap is set or opened, and Fig. 2 a similar view of the jaws in the position shown when the trap is closed.

The griping portion of the traps herein claimed is formed of separate right and left hand sections, the outline of which, when closed, will conform one with the other. These sections are each provided with two separate semi-elliptical or segmental jaws, A B, united at one of their ends very near to a pivot-pin, C, and at their other ends securely united to a clasping-arm, D, upon the extremity of which is formed the other pivot-pin, C', the pivot-pins C C' to be freely hinged to eyes formed upon the base-plate of the trap in the usual way.

The arms D pass through an eye in the free end of the spring which operates the trap, in the well-known manner, and are of such length as to allow the spring sufficient movement to close the jaws and force them tightly together. The under side or back of each of the arms is provided with a raised ridge, which slopes toward the pivot-pin C', making the arms slightly wedge-shaped, so that the spring will exert an increasing pressure the nearer the jaws are brought together, while the ridge will limit the movement of the spring, so that it will not be allowed to approach too near the jaws of the trap.

The outer jaws, B B, have sharp puncturing-teeth E E arranged upon their external sides at suitable distance apart, extending entirely around the jaw from near the point where it is united to the arm D upon the one end to near the pivot-pin C at the other, the teeth upon the jaw of the right-hand section being staggered or arranged at spaced intervals with the teeth upon the jaw of the left-hand section, so that the teeth of the one jaw will alternately lap between the teeth and over the side of the opposite jaw. The entire biting-edges of the outer jaws will thus be armed with strong teeth a suitable distance apart upon each jaw to secure strength, durability, and simplicity of construction, while the double row of teeth so arranged will leave no portion of the jaw exposed or unprotected.

The jaws A B are connected by one or more ribs, F, to strengthen and prevent an animal caught from moving the part clamped back and forth between the jaws, and this is quite necessary in traps for large animals. The face of the jaws A B is of sufficient width to firmly gripe the animal without cutting the skin, and the jaws are a suitable distance apart to allow a fold of the skin to pass between them, so that if a loose portion only of the skin of the animal is caught it will be folded between the inner and outer jaws, A B, the intervening space of which is entirely open, so that the flesh will be free to swell and enlarge the longer it is held between the jaws of the trap, even until the fleshy part, caused by its contusion, shall protrude beyond the outer edges of the jaws.

When the leg of the animal or any large portion of its body projecting sufficiently into the trap shall be caught by the inner jaws it will be held by the three instrumentalities—viz., the outer and inner jaws and the external penetrating-teeth. The inner jaws, being nearer the pivot-pins or axis of the trip, will exert greater force than the outer jaw, because of its shorter leverage, and will firmly hold the leg of the animal, so that it cannot be wrenched either way to pry the jaws open. The teeth placed around the outer jaw, being a sufficient distance apart, will as readily catch into the fold of the animal's skin, although the body may not be within the trap, and retain it between the jaws of the trap. The alternate teeth at the opposite jaw acting in conjunction with it, the animal will be securely held.

The bait-pan, trigger, and other appliances of the trap may be of any well-known construction, or the jaws of traps in general use may be readily removed and the jaws herein described and claimed substituted therefor.

We claim as our invention and desire to secure by Letters Patent—

1. An animal-trap having slots or perforations through each jaw from face to back, substantially as and for the purpose specified.

2. The above-described griping-sections of a spring-trap, formed of the combination of a separate outer jaw, provided with external spaced teeth to alternately lap the teeth of the opposite jaw, and an inner jaw united to the first by intermediate braces, and also at each end, to form a partitioned crescent opening between them, substantially as and for the purpose set forth.

GEORGE W. ROBERSON.
IRA B. ROBERSON.

Witnesses:
M. L. SHELDON,
A. GETTY.